(12) United States Patent
Zavodny et al.

(10) Patent No.: US 11,018,512 B2
(45) Date of Patent: May 25, 2021

(54) ENERGY STORAGE DEVICE CHARGE BALANCING

(71) Applicant: Hitachi Automotive Systems Americas, Inc., Harrodsburg, KY (US)

(72) Inventors: Stephen A. Zavodny, Highland, MI (US); Christopher Luman, Walled Lake, MI (US)

(73) Assignee: HITACHI AUTOMOTIVE SYSTEMS AMERICAS, INC., Harrodsburg, KY (US)

( * ) Notice: Subject to any disclaimer, the term of this patent is extended or adjusted under 35 U.S.C. 154(b) by 168 days.

(21) Appl. No.: 16/211,328

(22) Filed: Dec. 6, 2018

(65) Prior Publication Data
US 2020/0185934 A1 Jun. 11, 2020

(51) Int. Cl.
*H02J 7/00* (2006.01)
*H02J 7/34* (2006.01)

(52) U.S. Cl.
CPC .......... *H02J 7/0019* (2013.01); *H02J 7/0021* (2013.01); *H02J 7/345* (2013.01)

(58) Field of Classification Search
USPC ........................................................ 320/118
See application file for complete search history.

(56) References Cited

U.S. PATENT DOCUMENTS

| | | | |
|---|---|---|---|
| 5,498,950 A | 3/1996 | Ouwerkerk | |
| 5,631,534 A | 5/1997 | Lewis | |
| 6,121,751 A | 9/2000 | Merritt | |
| 7,622,893 B2 | 11/2009 | Williams | |
| 8,766,597 B2 | 7/2014 | Nork et al. | |
| 2002/0196026 A1 | 12/2002 | Kimura et al. | |
| 2003/0102845 A1* | 6/2003 | Aker | H02J 7/0042 320/139 |
| 2006/0097698 A1 | 5/2006 | Plett | |
| 2007/0139015 A1 | 6/2007 | Seo et al. | |
| 2008/0036421 A1 | 2/2008 | Seo et al. | |
| 2011/0076525 A1 | 3/2011 | Zhang et al. | |
| 2012/0105010 A1 | 5/2012 | Kinoshita | |
| 2017/0310127 A1 | 10/2017 | Wu | |
| 2019/0027967 A1* | 1/2019 | Jung | H02J 50/05 |
| 2019/0115769 A1* | 4/2019 | Chen | H02J 7/00714 |

FOREIGN PATENT DOCUMENTS

| | | |
|---|---|---|
| JP | 2009-071936 A | 4/2009 |
| JP | 2010-529817 A | 8/2010 |
| WO | 2008/097031 A1 | 8/2008 |

* cited by examiner

*Primary Examiner* — Mohammed Alam
(74) *Attorney, Agent, or Firm* — Mattingly & Malur, PC

(57) ABSTRACT

In some examples, a controller may determine, from among a plurality of energy storage units, a first energy storage unit having a higher than median charge and a second energy storage unit having a lower than median charge. The controller may connect the first energy storage unit to a resonant circuit to transfer energy from the first energy storage unit to the resonant circuit. The controller may then disconnect the first energy storage unit from the resonant circuit, and connect the second energy storage unit to the resonant circuit to transfer energy from the resonant circuit to the second energy storage unit to at least partially balance a charge difference between the first energy storage unit and the second energy storage unit.

19 Claims, 4 Drawing Sheets

ENERGY STORAGE DEVICE CHARGE BALANCING

BACKGROUND

Maintaining balanced voltages in an energy storage device, such as in a multiple-cell battery, multiple-battery battery pack, or in a bank of super capacitor cells, may help maximize the life of the energy storage device and achieve operation that is more efficient. For example, the individual cells in a battery may have different capacities and/or may be at different state-of-charge levels. Without balancing, the smallest capacity cell might be overcharged or over-discharged, while cells with higher capacities might be only partially charged or discharged.

A common conventional technique for battery balancing employs a passive approach in which battery cells with a higher than median voltage are resistively drained to lower the voltages of those specific cells. However, this technique wastes power by draining the battery and can result in premature battery discharge.

SUMMARY

Some implementations include arrangements and techniques for at least partially balancing a charge difference between two energy storage units. For instance, a controller may determine, from among a plurality of energy storage units, a first energy storage unit having a higher than median charge and a second energy storage unit having a lower than median charge. The controller may connect the first energy storage unit to a resonant circuit to transfer energy from the first energy storage unit to the resonant circuit. The controller may then disconnect the first energy storage unit from the resonant circuit and connect the second energy storage unit to the resonant circuit to transfer energy from the resonant circuit to the second energy storage unit to at least partially balance the charge difference between the first energy storage unit and the second energy storage unit.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
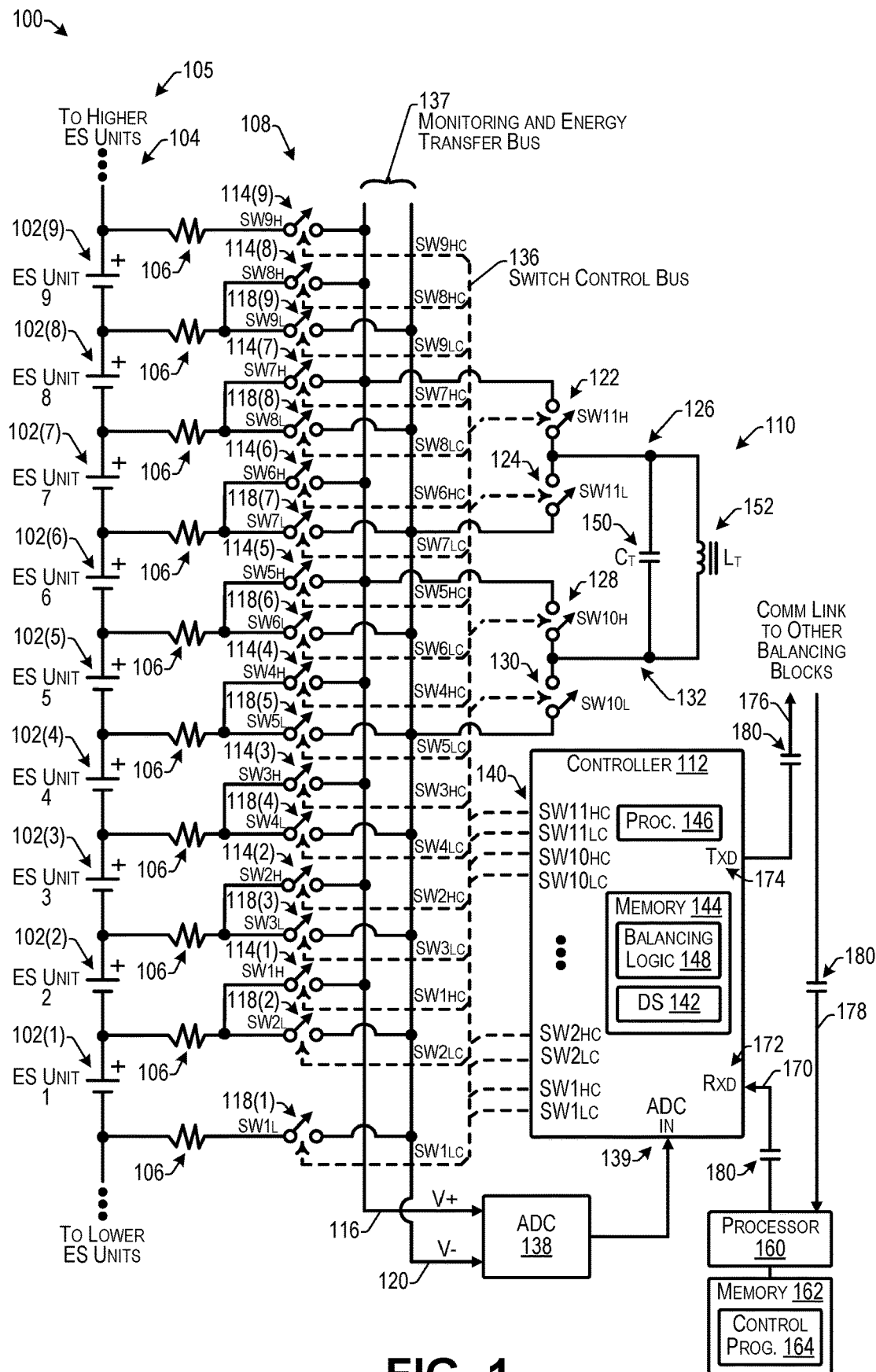
FIG. 1 illustrates a plan view of a balancing circuit according to some implementations.

The technology herein includes arrangements and techniques for equalizing charges across a plurality of discrete energy storage units (also referred to as "cells" in some examples) of an energy storage device, such as a multi-cell battery, a multi-battery battery pack, a plurality of supercapacitor cells, or the like, by transferring some electrical charge from one or more energy storage units having a higher than median voltage to one or more other energy storage units having a lower than median voltage. In implementations herein, an electronically controlled switch array may be configured to connect an energy retaining circuit, such as a resonant LC circuit, to individual energy storage units of the energy storage device. The switch array may be controlled to briefly connect a selected individual energy storage unit that has a higher voltage charge level to the energy retaining circuit, thereby transferring some of the selected energy storage unit's excess electrical charge to the energy retaining circuit. The switch array may then be controlled to connect the energy retaining circuit to another selected energy storage unit having a lower voltage charge level, thereby transferring some of the stored energy from the energy retaining circuit to the energy storage unit having the lower voltage. In some examples, the switching network and/or energy retaining circuit may be adjusted to closely match the impedance of the energy source storage units and energy receiving storage units to enable a more efficient energy transfer.

In some examples, a plurality of the energy storage units may be a plurality of battery cells grouped into a block of cells for performing balancing among the cells in the block. A switching network and a single energy retaining circuit may form a balancing circuit for each block of cells. The number of cells per balancing circuit is not limited to any particular number of cells (e.g., 6 cells, 8 cells, 10 cells, 12 cells, and so forth). Furthermore, in some cases, a battery may be divided into multiple blocks of multiple cells each, and each block may have a separate balancing circuit. Additionally, in some instances, a plurality of the balancing circuits may communicate with a common processor that manages and controls the plurality of balancing circuits.

Further, each balancing circuit may include a plurality of resistors between the battery cells and the remainder of the balancing circuit to serve as current limiting resistors. The resistors may limit an "in-rush" current to acceptable levels and may limit a fault current to safe levels in the event of a device failure. The balancing circuit may further include circuitry (e.g., plugs, connectors, or the like) to enable "hot-plugging" of the balancing circuitry to an array of charged battery cells.

One example implementation may include, but is not limited to, an array of N-Channel MOSFETs (metal-oxide-semiconductor field-effect transistors) with a biasing network and a bootstrap voltage source. For example, there may be a pair of switches for each energy storage unit included in the balancing circuit to enable connection of the energy storage units to the energy retaining circuit for charge balancing and for connecting the energy storage units to the controller for detecting the state of charge (SOC) of each energy storage unit to determine whether to perform balancing. In addition. a first pair of switches may be connected to a first side of the energy retaining circuit (e.g., the resonant circuit) and a second pair of switches may be connected to a second side of the energy retaining circuit to enable connection of the energy retaining circuit to the energy storage units from the first side or the second side. The switches herein may support bidirectional current flow. Further, in some examples, two or more switches may be arranged in series to enable redundant cell turn-off to enhance the safety of the controller and other components.

Communications between individual controllers may be performed on a communications bus, such as via a capacitively coupled communications link. The communications bus enables communications between controllers connected to different portions, e.g., different blocks, of the battery array. To enhance isolation between the high voltage and low voltage domains, pulse transformer based communications may be employed in some cases between the controllers and a system controller.

Using the single LC resonant circuit as the energy retaining circuit herein has several advantages over conventional techniques. For example, the inductor may be more efficient at transferring a charge out of the source battery cell and into the destination cell by improving impedance matching. Furthermore, providing a capacitor in parallel with the inductor provides a resonant circuit that aids the switching arrangement by enabling the switching to be set to occur during a zero crossing event. Switching during a zero crossing event may reduce the potential for an accidental shoot-through event. Additionally the switching of the current direction may simplifies the switching sequence.

Initially, the controller may determine the SOC (e.g., the voltage) of each of the cells in the block of cells. For example, the controller may identify one or more cells with a higher than median voltage and one or more other cells with a lower than median voltage (e.g., the controller may determine the cell(s) with the highest voltage and the cell(s) with the lowest voltage, respectively). After the controller has identified the cell(s) with higher than median cell voltage and the cell(s) with lower than median cell voltage, the controller may store the respective cell identifiers (IDs) in a local memory, register array, or the like.

The controller may then transfer a charge from a selected one of the higher than median cells to the energy retaining circuit. In particular, the controller activates switches to connect the selected higher than median cell to the energy retaining circuit. A charge is transferred from the selected higher than median cell to the energy retaining circuit. After a maximum amount of energy that may be maintained by the energy retaining circuit has been transferred, the switches connecting the selected higher than median cell are opened to stop the transfer of energy to the energy retaining circuit.

Next, the controller may proceed to charge a selected lower than median cell by closing switches to connect the selected lower than median cell to the energy retaining circuit. This transfers the charge from the energy retaining circuit to the selected lower than median cell. After a maximum amount of energy has been transferred from the energy retaining circuit to the selected cell, the controller may open the switches to disconnect the selected lower than median cell from the now depleted energy retaining circuit.

The controller repeats the process either with the same set of cells or with one or more other cells as either the higher than median cell or the lower than median cell. For instance, the controller may rotate to a next set of cells to be balanced. In some cases, the energy retaining circuit may be a resonant LC circuit including a capacitor and inductor connected in parallel. In this case, when the switches on the selected higher voltage cell are disconnected, the LC network will oscillate such that the voltage across the inductor and capacitor will cross 0 volts repeatedly and achieve alternating polarity of voltage and current (e.g., a sinusoidal AC current and voltage). The switches on the selected lower voltage cell may be connected to the resonant circuit to charge the selected lower voltage cell with the AC current in the resonant circuit.

For discussion purposes, some examples are described in the environment of a vehicle battery. However, implementations herein are not limited to the particular examples provided, and may be extended to other service environments, other types of batteries, other types of energy storage devices, such as supercapacitors, or the like, as will be apparent to those of skill in the art in light of the disclosure herein.

FIG. 1 illustrates a plan view of a balancing circuit 100 according to some implementations. In this example, a plurality of energy storage (ES) units 102(1)-102(9) are connected in series from a first energy storage unit 102(1) to a ninth energy storage unit 102(9) to form a block 104 of energy storage units 102, which may be referred to as a "stack" or "pack" in some examples. In the illustrated example, the energy storage units 102 may be respective battery cells in an array of battery cells, respective batteries in an array of batteries, respective supercapacitor cells in an array of supercapacitor cells, or other types of discrete energy storage units able to be subject to the energy balancing herein.

For instance, in the case of a battery, each of the energy storage units 102 may be a single physical battery cell, a plurality of physical battery cells, a complete physical battery, or the like. As several non-limiting examples, the energy storage units 102 may be lithium ion cells or batteries, Li-ion polymer cells or batteries, nickel metal hydride cells or batteries, nickel cadmium cells or batteries, lead-acid cells or batteries, metal-air cells or batteries, or any of various other types of battery cells or batteries. Further, while nine energy storage units 102 are illustrated in this example, in other examples, there may be more or fewer energy storage units in the block 104. Additionally, in some examples, there may be multiple blocks 104, with each block 104 including a plurality of the energy storage units 102 connected to a respective balancing circuit 100.

The balancing circuit 100 may be connected to energy storage units 102(1)-102(9) as illustrated and may be operated to effect charge balancing among the energy storage units 102(1)-102(9). For example, the balancing circuit 100 may detect the state of charge (SOC) of each of the individual energy storage units 102(1)-102(9), and may transfer energy from selected ones of the energy storage units 102(1)-102(9) to other selected ones of the energy storage units 102(1)-102(9) to effect SOC balancing.

The balancing circuit 100 may include a plurality of resistors 106 between the energy storage units 102 and the remainder of the balancing circuit 100 to serve as current limiting resistors. The resistors 106 may limit an "in-rush" current to acceptable levels when a selected energy storage unit 102 is connected to the balancing circuit 100. Further, the resistors 106 may limit a fault current to safe levels in the event of a failure of an energy storage unit 102. The balancing circuit may further include circuitry (e.g., plugs, connectors, or the like—not shown in FIG. 1) to enable "hot-plugging" of the balancing circuit 100 to the charged energy storage units 102.

The balancing circuit 100 further includes a switch array 108 of switches corresponding to the energy storage units 102(1)-102(9). As one example, the switch array 108 may include a MOSFET (metal-oxide-semiconductor field-effect transistor) or other electronically controlled arrangement of switches configured to connect individual ones of the energy storage units 102 to a resonant LC circuit 110 or other energy retaining circuit. In addition, the switch array 108 may be configured to connect individual ones of the energy storage units 102 to a controller 112, such as a processor, microcontrol unit, logic circuit (e.g., a state machine), or the like, for detecting a current charge level of each of the energy storage units 102 to determine which of the energy storage units 102 may be candidates for charge balancing.

The switch array 108 includes a pair of unit switches associated with each energy storage unit 102, namely, a high-side unit switch 114 for connecting a high side (e.g., the higher electrical potential side) of each energy storage unit 102 to a high-side bus 116, and a low-side unit switch 118 for connecting a low electrical potential side (e.g., a common return path, ground plane, or the like) of each storage unit 102 to a low-side bus 120. Accordingly, the switch array includes low-side unit switches $SW1_L$ through $SW9_L$ 118(1)-118(9) and high-side unit switches $SW1_H$ through $SW9_H$ 114(1)-114(9) that are operable for selectively connecting the respective energy storage units 102(1)-102(9) to the low-side bus 120 and the high-side bus 116, respectively. For example, a first high-side unit switch 114(1) may be closed to connect the upper side of the first energy storage unit 102(1) to the high-side bus 116, and a first low-side unit switch 118(1) may be closed to connect a low side of the first energy storage unit 102(1) to the low-side bus 120.

Further, the switches 114, 118 may be operable to connect multiple ones of the energy storage units 102 in series to the high-side bus 116 and the low-side bus 120. For example, rather than closing the first high-side unit switch 114(1), suppose that the switches 118(1) and 114(2) are closed. In this case, both the first energy storage unit 102(1) and the second energy storage unit 102(2) are connected concurrently, such as for both discharging energy concurrently, or for both receiving energy concurrently.

In addition, the switch array 108 includes a first pair of resonant circuit (RC) switches 122, 124 at a first end 126 of the resonant circuit 110, and a second pair of RC switches 128, 130 at a second end 132 of the resonant circuit 110. For example, the high-side $SW11_H$ RC switch 122 may be closed for connecting the first end 126 of the resonant circuit 110 to the high-side bus 116 and the low-side $SW11_L$ RC switch 124 may be closed for connecting the first end 126 of the resonant circuit 110 to the low-side bus 120. Similarly, the high-side $SW10_H$ RC switch 128 may be closed for connecting the second end 132 of the resonant circuit 110 to the high-side bus 116 and the low-side $SW10_L$ RC switch 130 may be closed for connecting the second end 132 of the resonant circuit 110 to the low-side bus 120. Typically, as discussed additionally below, the RC switches 122 and 130 might be closed at the same time, while the RC switches 124 and 128 remain open, e.g., when charging the resonant circuit, and the RC switches 124 and 128 might be closed at the same time, while the RC switches 122 and 130 remain open, e.g., when discharging the resonant circuit 110.

Additionally, the switch array 108 includes a switch control bus 136 that may pass control signals from the controller 112 to one or more desired switches in the switch array 108 for closing or opening a selected switch. For example, the controller 112 may have a plurality of ports 140 for directing signals to desired switches in the switch array 108. The control lines include low-side control lines $SW1_{LC}$ through $SW11_{LC}$ connected to the low-side switches 118(1)-118(9), 124, and 130, and high-side control lines $SW1_{HC}$ through $SW11_{HC}$ connected to the high-side switches 114(1)-114(9), 122, and 128. Thus, the controller 112 is able to connect individual ones or multiple ones of the energy storage units 102 to the high-side bus 116 and low-side bus 120, such as for detecting the SOC of each energy storage unit 102 and for transferring energy into or away from selected ones of the energy storage units 102. Thus, together, the high-side bus 116 and the low-side bus 120 comprise a monitoring and energy transfer bus 137 in the switch array 108 that can be used for both determining the SOC of each energy storage unit 102 and for transferring energy from a higher charge energy storage unit 102 to a lower charge energy storage unit 102.

The high-side bus 116 and the low-side bus 120 may connect to an analog to digital converter (ADC) 138, such as a 12-bit ADC or the like. The ADC 138 may connect to an "ADC in" port 139 of the controller 112 for providing a digital signal indicative of a current SOC of each of the energy storage units 102 when checking the SOC of each of the energy storage units 102. For example, the controller 112 may periodically cycle through connecting each of the energy storage units 102 to the ADC 138 to measure the SOC of each of the energy storage units 102. the ADC 138 converts the voltage to a numerical value and provides the numerical value to the controller via the ADC in port 139. Accordingly, the controller 112 is able to receive an indication of the SOC of each of the energy storage units 102, and may store this information, such as in a data structure (DS) 142 in a memory 144 in association with a corresponding energy storage unit ID, such as in the case that the controller includes a processor that executes balancing logic 148 to perform the functions described herein. Alternatively, in the case that the controller 112 is a logic circuit that executes as a state machine, the value of the SOC determined for each energy storage unit 102 may be stored in a register designated for that energy storage unit 102.

The resonant circuit 110 may include a capacitor $C_T$ 150 and an inductor $L_T$ 152 connected in parallel to the first end 126 and the second end 132. The resonant circuit 110 is able to store energy received from one or more of the energy storage units 102. The received energy travels back and forth between the inductor $L_T$ 152 and the capacitor $C_T$ 150 at the resonant circuit's resonant frequency in effect creating an alternating current. As discussed additionally below, when the charged resonant circuit 110 is connected to a lower charge energy storage unit 102 at a desired timing, the electrical charge is transferred from the resonant circuit 110 to the connected energy storage unit 102 to charge the energy storage unit 102. Furthermore, while an LC parallel circuit is described as the resonant circuit in some examples herein, other types of resonant circuits may be used in other examples, as will be apparent to those of skill in the art having the benefit of the disclosure herein.

The balancing system 100 may further include a processor 160 and memory 162. For example, the memory 162 may include a control program 164 that may be executed by the processor 160 to manage the operation of the controller 112 and any other controllers (not shown in FIG. 1) that may be included in other balancing circuits for other blocks of energy storage units 102. As one non-limiting example, the balancing circuit 100 may be implemented in a vehicle for maintaining the charge balance among the cells in a vehicle battery. Thus, the control program 164 may be executed by the processor 160 to communicate with each of the balancing circuits 100 as well as with other vehicle systems for sending and receiving information. For instance, the control program 164 may communicate the SOC determined by each controller, such as to enable presentation of the current SOC of the energy storage device 105. Furthermore, in some cases, the control program 164 may enable or control charge balancing between the blocks 104, such as through use of additional circuitry, which may include a transformer or other energy storage devices.

In the illustrated example, a communication link 170 connects the processor 160 to a receive port 172 of the controller 112 to enable the processor 160 to send instructions to the controller 112, such as to start or stop execution of charge balancing by the controller 112. In addition, the controller 112 includes a transmit port 174 that connects to a communication link 176, which may send information to another controller and/or to the processor 160 or to another processor (not shown). Further, a communication link 178 may enable the processor 160 to receive communications from at least one of the controller 112, other controllers, or other processors associated with other systems or the like (not shown in FIG. 1).

Each of the communication links 170, 176, and 178 may include an inline capacitor 180 or other device to protect the processor 160, controller 112, and/or other devices from power surges or the like. For example, communications between individual controllers 112 and/or with the processor 160 may be via an isolated communications scheme. As illustrated the capacitively coupled communications link enable electrically isolated communications between different controllers 112 connected to different portions of a battery array or other energy storage device 105. To further enhance isolation between the high voltage and low voltage domains, pulse transformer based communications may be employed between the b controller 112 and the processor 160 and/or other connected systems.

The processor 160 and/or the processor 146, when included, may each comprise one or more processors or processing cores. For example, the processor(s) 146, 160 may be implemented as one or more microprocessors, microcomputers, microcontrollers, digital signal processors, central processing units, logic circuitries, and/or any devices that manipulate signals based on operational instructions. In some cases, the processor(s) 146, 160 may be one or more hardware processors and/or logic circuits of any suitable type specifically programmed or configured to execute the algorithms and processes described herein. The processor(s) 146, 160 can be configured to fetch and execute computer-readable processor-executable instructions stored in the memory 144, 162, respectively.

The memory 162 and/or the memory 144, when included, may be an example of tangible non-transitory computer storage media and may include volatile and nonvolatile memory implemented in any type of technology for storage of information such as computer-readable processor-executable instructions, data structures, program modules, or other data. The memory 144 and/or the memory 162 may include, but is not limited to, RAM, ROM, EEPROM, flash memory, solid-state storage, magnetic disk storage, optical storage, and/or other computer-readable media technology. Accordingly, the memory 144 and/or the memory 162 may be computer storage media able to store instructions, programs, or components that may be executed by the processor 146 and/or the processor 160, respectively. Further, when mentioned, non-transitory computer-readable media exclude media such as energy, carrier signals, electromagnetic waves, and signals per se.

As mentioned above, in some examples, the controller 112 may include the processor 146 for executing balancing logic 148 or other executable instructions. For instance, the balancing logic 148 may be firmware or other executable code stored in the memory 144. In these examples, a data structure 142 may also be stored in the memory 144 for storing the SOC determined for each of the energy storage units 102. Additionally, in other examples, the processor 146 and memory 144 might not be included, and the controller 112 may be a logic circuit configured as a state machine for performing the functions described herein. Numerous other variations will be apparent to those of skill in the art having the benefit of the disclosure herein.

Figure 2:
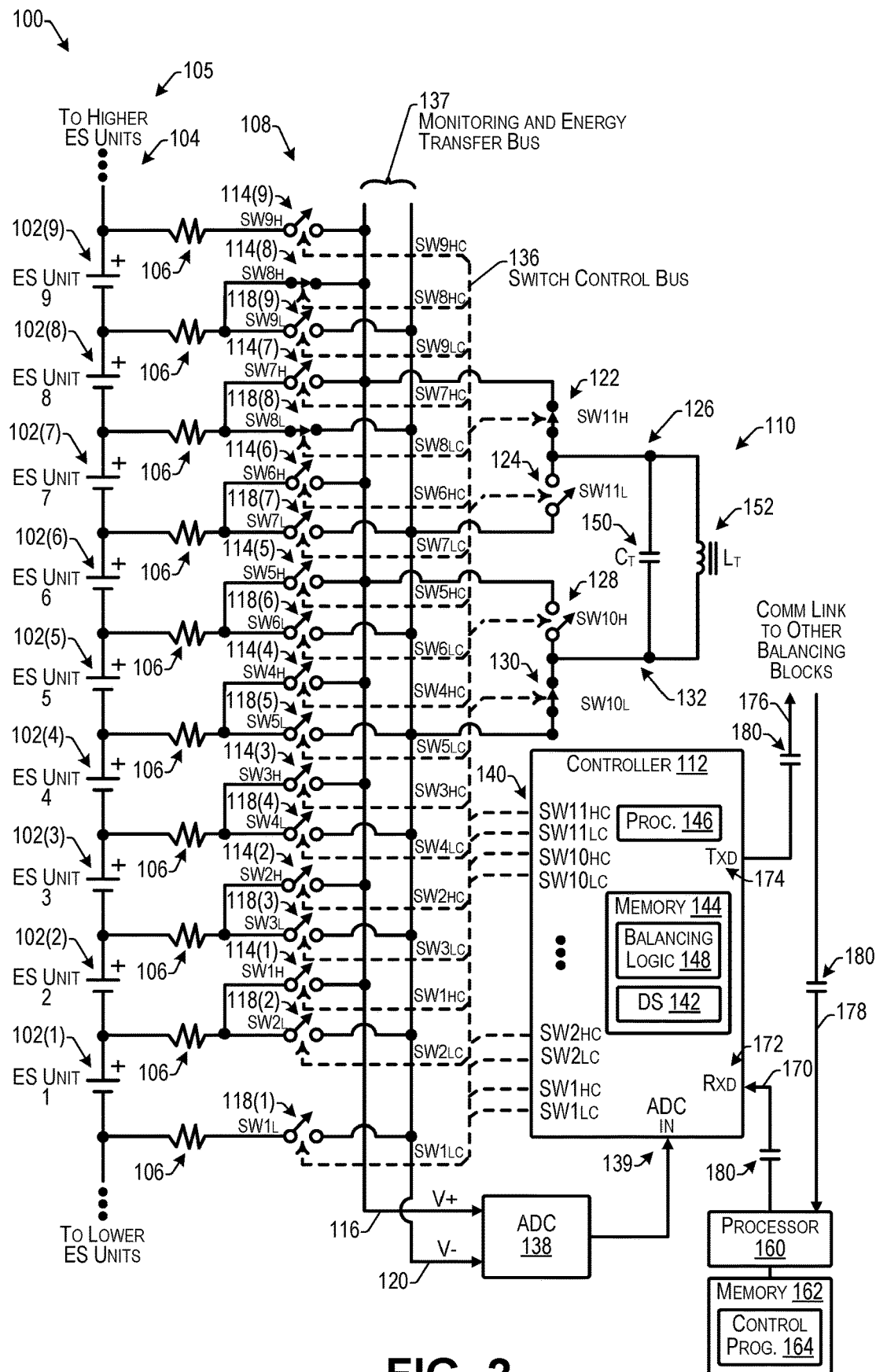
FIG. 2 illustrates an example of the balancing circuit according to some implementations.

FIG. 2 illustrates an example of the balancing circuit 100 according to some implementations. Initially, the controller 112 may determine the SOC (e.g., voltage) of each of the energy storage units 102(1)-102(9) in the block 104 of energy storage units 102 managed by the balancing circuit 100. For example, the controller 112 may open respective pairs of switches 114 and 118 for each respective energy storage unit 102(1)-102(9) to determine an indication of the existing SOC for each energy storage unit 102(1)-102(9). Thus, the controller 112 might start with energy storage unit 102(1) by briefly opening the switches 118(1) and 114(1) to receive a voltage signal from the energy storage unit 102(1) through the ADC 138 as an indication of the SOC of the first energy storage unit 102(1). The controller 112 may store this value in the data structure 142 in the case that the processor 146 is used (or in a register in the case that a logic circuit is used). The controller 112 may repeat this process for each of the energy storage units 102(2)-102(9).

The controller 112 may subsequently compare each stored SOC value with the other stored SOC values, such as for determining a ranking of the indicated SOC for each of the energy storage units 102. If a difference between the highest SOC and the lowest SOC exceeds a threshold, the controller 112 may perform balancing between, e.g., the highest ranked energy storage unit 102 and the lowest ranked energy storage unit 102. Further, additional charge balancing may take place between other ones of the energy storage units 102 following charge balancing between one of the higher ranked energy storage units 102 and one of the lower ranked energy storage units 102. Alternatively, in other examples, following charge balancing, between two of the energy storage units 102, the existing SOC of the energy storage units 102(1)-102(9) may again be determined and ranked.

In the illustrated example, suppose that the controller 112 has selected the eighth energy storage unit 102(8) as a relatively higher charge energy storage unit from which to transfer energy, and has selected the second energy storage unit 102(2) as a relatively lower charge energy storage unit to which to transfer the energy. Accordingly, the controller 112 may send control signals to close a pair of the switches at the resonant circuit 110 to connect the resonant circuit 110 to the monitoring and energy transfer bus 137. For instance, the switches 122 and 130 may be closed, as illustrated.

In addition, the controller 112 may send control signals to close the pair of switches corresponding to the eighth energy storage unit 102(8), i.e., switch 114(8) and switch 118(8), as illustrated. Thus, the high-side switch 114(8) connects the higher electrical potential side of the energy storage unit 102(8) to the high-side bus 116, and thereby to the end 126 of the resonant circuit 110. Further, the low-side switch 118(8) connects the lower electrical potential side of the energy storage unit 102(8) to the low-side bus 120, and thereby to the end 130 of the resonant circuit 110.

The direct current transferred from the energy storage unit 102(8) is received and retained in the resonant circuit 110 by cycling between the capacitor 150 and the inductor 152 according to the resonant circuit's natural resonance. Following the elapse of a period of time, the controller 112 may send control signals to open the switches 122 and 130 to retain the received energy in the resonant circuit, and may send control signals to the switches 114(8) and 118(8) to disconnect the energy storage unit 102(8) from the monitoring and energy transfer bus 137. For example, after a maximum amount of energy that may be maintained by the energy retaining circuit has been transferred, the switches 122 and 130 connecting the resonant circuit 110 to the monitoring and energy transfer bus 137 may be opened or otherwise disconnected.

Figure 3:
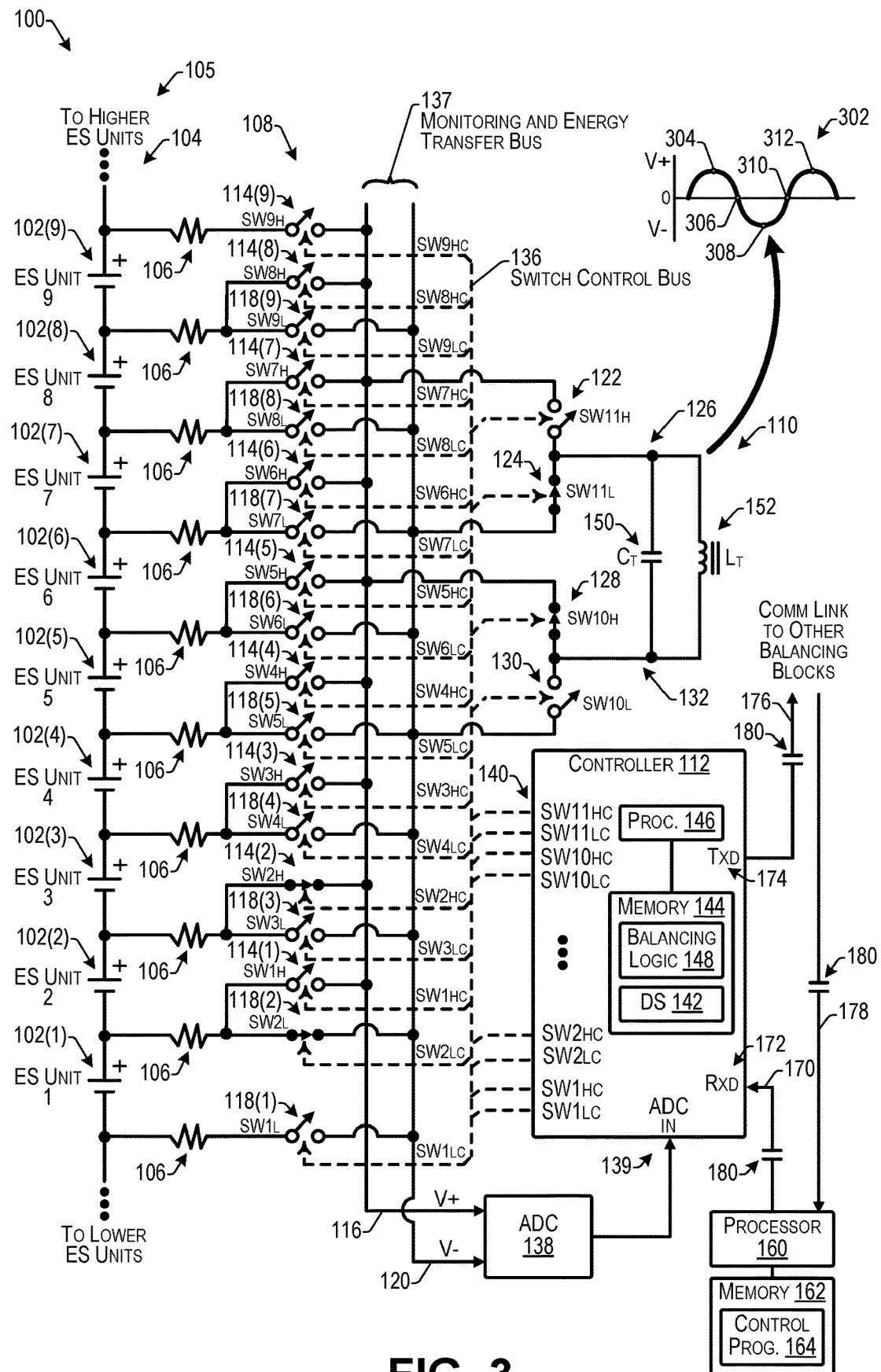
FIG. 3 illustrates an example of the balancing circuit according to some implementations.

FIG. 3 illustrates an example of the balancing circuit 100 according to some implementations. Continuing the example of FIG. 2 discussed above, to transfer the energy from the resonant circuit 110 to the second energy storage unit 102(2), the controller 112 may send control signals for closing switches 114(2) and 118(2) corresponding to the second energy storage unit 102(2) to connect the second energy storage unit 102(2) to the monitoring and energy transfer bus 137. In addition, the controller 112 may send control signals for closing switches 124 and 128 at the resonant circuit 110 for connecting the resonant circuit 110 to the monitoring and energy transfer bus 137. This causes the alternating current in the resonant circuit 110 to pass through the monitoring and energy transfer bus 137 to the second energy storage unit 102(2) to charge the second energy storage unit 102(2).

After a the elapse of a period of time, the controller 112 opens or otherwise disconnects the switches 114(2) and 118(2) to maintain the transferred energy in the second energy storage unit 102(2). The controller 112 may also open or otherwise disconnect the switches 124 and 128 at the resonant circuit to return the balancing circuit to the configuration of FIG. 1. Accordingly, after the maximum amount of energy has been transferred, switches 114(2) and 118(2) are opened and the controller 112 may either repeat the process with the same set of energy storage units 102(2) and 102(8), or may rotate to a next pair of energy storage units 102 to be balanced.

As mentioned above, the resonant circuit 110 may resonate as a sinusoidal AC current and voltage as indicated at 302. In the process discussed above, through the use of the resonant LC circuit 110, when the switches 114(8) and 118(8) on the higher charge energy storage unit 102(8) are connected, the resonant circuit 110 oscillates such that the voltage across the inductor 152 and the capacitor 150 crosses 0 volts repeatedly and achieve alternating polarity of voltage and current (i.e., sinusoidal AC current and voltage). As one example, the switches 114(8) and 118(8) on the higher charge energy storage unit 102(8) may be disconnected when the voltage reaches a maximum, e.g., at 304. Subsequently, the reverse polarity of the switches 124 and 128 on the resonant circuit 110 may be employed by connecting (closing) the switches 124, 128, 114(2), and 118(2) at the first zero crossing event as indicated at 306, and then disconnecting (opening) the switches 124, 128 at the bottom peak 308, the switches 130, 122 may then be opened at the next zero crossing event 310, and the switches 130, 122 may be closed when the voltage peaks at 312. The process may be repeated until the charge on the resonant circuit 110 is depleted.

Thus, the controller 112 may cause the opening of the switches 114(2), 118(2) and 122, 130 or 124, 128 to occur during the zero crossing event (i.e., when the sine wave 302 crosses from high side to low side or vice versa), which reduces the potential for an accidental shoot-through event, such as when the switches for both energy storage units 102(8) and 102(2) are open at the same time. Further, the switching of the current direction additionally simplifies the switching sequence by using the second pair of switches (i.e., switches 124 and 128 in this example) at the resonant circuit 110.

In some examples, the timing of the closing and opening of the switches for charging the resonant circuit 110 (e.g., switches 122, 124, 128, 130, 114(8), and 118(8) in this example) and for transferring the charge from the resonant circuit 110 to the second energy storage unit 102(2) (e.g., switches 122, 124, 128, 130, 114(2) and 118(2) in this example) may be controlled by the controller 112 using any of various techniques. As one example, the system timing may be fixed based on the resonant frequency of the resonant circuit 110 formed by the capacitor $C_T$ 150 and the inductor $L_T$ 152. For example, the resonant frequency f of the resonant circuit 110 may be expressed by the following equation:

$$f = \frac{1}{2\pi\sqrt{LC}}$$

in which L is the inductance of the inductor $L_T$ 152 and C is the capacitance of the capacitor $C_T$ 150.

The period p of a sinusoidal wave produced by this LC resonant circuit 110 is 1/f and the peak current may occur at approximately 0.125 p. Accordingly, the zero current time (e.g., a zero crossing event) may occur at 0.25 p. An external resistance along with an internal time may be used to calibrate the controller 112 to the resonant frequency of the resonant circuit 110.

Alternatively, as another example, current and voltage sensing may be used to determine the correct switching times. In this case, additional circuitry (not shown in FIG. 3) connecting to the controller 112 may be included for sensing current and voltage, e.g., at the resonant circuit 110. Including this sensing circuitry may provide an advantage of enabling the controller 112 to automatically adjust to variations in the resonant circuit component values. In this case, the resonant circuit charging cycle (e.g., when the resonant circuit 110 is connected to the higher value energy storage unit (i.e., the eighth energy storage unit 102(8) in the example discussed above)) may be terminated when the current reaches a constant value.

The energy storage unit charging cycle (e.g., when the resonant circuit 110 is connected to the lower value energy storage unit (i.e., the second energy storage unit 102(2) in the example discussed above)) may start when the resonant voltage equals and begins to exceed the voltage of the energy storage unit to be charged, or the inverse voltage since the design permits charging on either the positive going cycle or the negative going cycle. The charging phase may terminate when the charging current in the resonant circuit 110 goes to zero. Once the peak voltage of the resonant circuit 110 is equal to or less than the voltage of the energy storage unit to be charged, the controller 112 may begin a next charging cycle by connecting the resonant circuit to a higher charged energy storage unit. Accordingly, by sensing the voltage and current associated with the resonant circuit, the controller 112 may adjust to the individual energy storage unit voltages and impedances.

As mentioned above, in some examples, the switch array 108 or energy retaining resonant circuit 110 may be adjusted to closely match the impedance of the energy source and energy drain energy storage units 102(8) and 102(2), respectively, to facilitate a more efficient energy transfer. Thus, using a single LC resonant circuit 110 as an energy retaining circuit enables efficient transfer of the charge from the higher charge source energy storage unit and into the destination lower charge energy storage unit by improving impedance matching.

As several non-limiting examples, some applications of the energy balancing techniques herein may be employed with 60 to 100 battery or capacitor cells as the energy storage units arranged in series. Accordingly, in these examples, a faster transfer cycle may be advantageous, such as by providing charge transfer cycles in the range of 1.0 uSec to 1.0 mSec per transfer in an effort to monitor and balance all of the energy storage units per controller 112. In such a case, the resonant circuit frequency might range from 2.0 kHz to as high as 2.0 MHz. However, implementations herein are limited to any particular frequency for the resonant circuit 110, and a suitable resonant frequency may be dependent at least partially on the types of energy storage device with which the balancing circuit is used as well as various other design considerations, as will be apparent to those of skill in the art in light of the disclosure herein.

Figure 4:
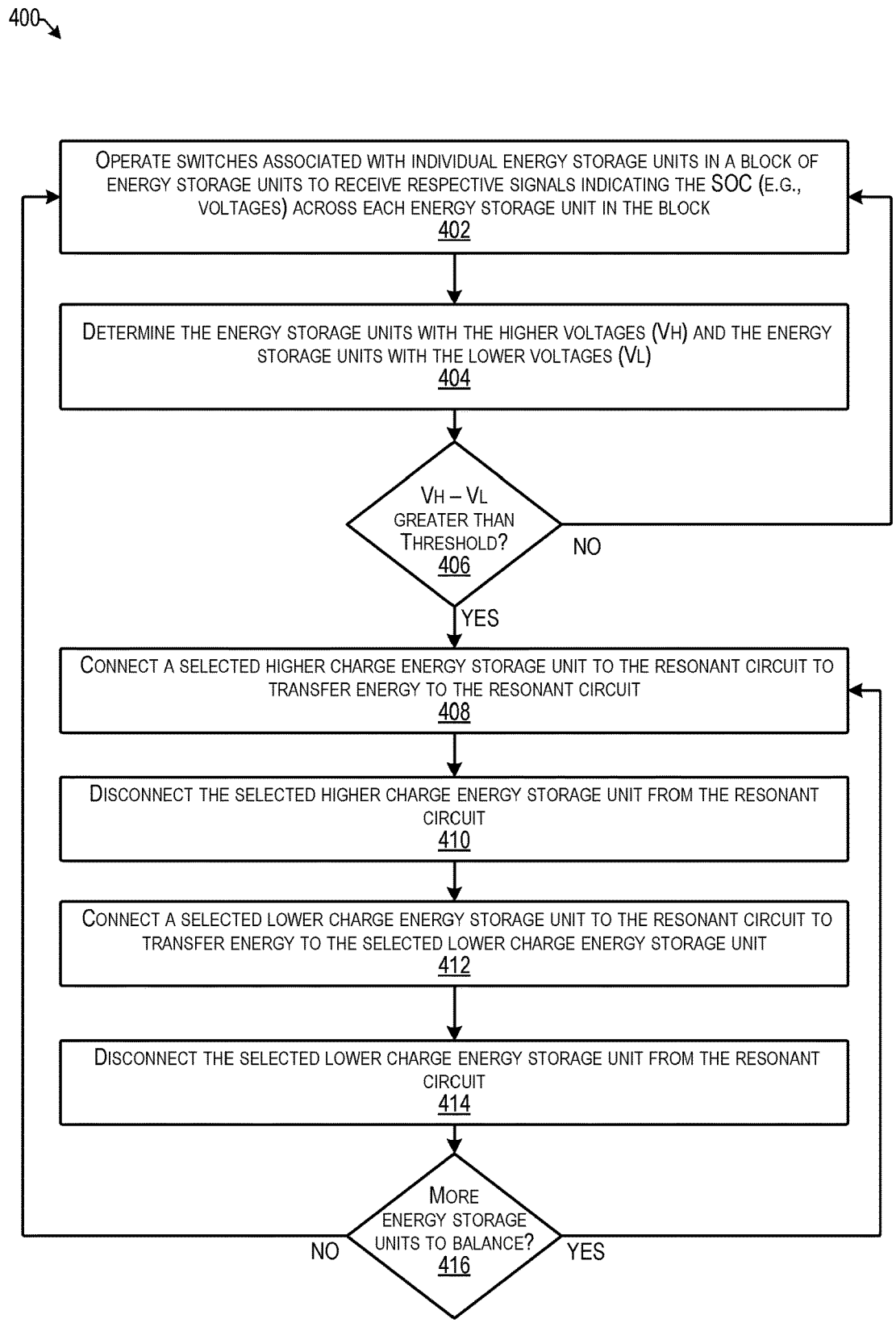
FIG. 4 is a flow diagram illustrating an example process according to some implementations.

FIG. 4 is a flow diagram illustrating an example process 400 according to some implementations. The process is illustrated as a collection of blocks in a logical flow diagram, which represents a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems, and devices described in the examples herein, although the processes may be implemented in a wide variety of other environments, systems, and devices. In some examples, the process 400 of FIG. 4 may be executed at least partially by the controller 112, such as by executing balancing logic code, or in the case that the controller is a logic circuit, executing as a state machine, or the like.

At 402, the controller may operate switches associated with individual energy storage units in a block of energy storage units to receive respective signals indicating the SOC (e.g., voltages) across each energy storage unit in the block. Accordingly, during a sensing cycle, the controller may sense the current SOC of each of the energy storage units that the controller manages.

At 404, the controller may determine the energy storage units with the higher voltages ($V_H$) and the energy storage units with the lower voltages ($V_L$). As one example, the controller may rank the SOC of the energy storage units from highest to lowest, to determine a median SOC, and to further determine which energy storage units have the highest SOC, and which have the lowest SOC relative to the other energy storage units managed by the controller.

At 406, the controller may determine if the difference between $V_H$ and $V_L$ is greater than a threshold sufficient to warrant balancing of the SOC between two or more energy storage units. As one non-limiting example, the threshold may be based on a percentage of the total charge, e.g., if there is more than a five percent difference between the charge at the highest charge energy storage unit and the charge at the lowest charge energy storage unit, then balancing may be performed. If balancing is not going to be performed, the process may return to 402. If balancing is to be performed, the process proceeds to 408.

At 408, the controller may connect a selected higher charge energy storage unit to the resonant circuit to transfer energy to the resonant circuit.

At 410, the controller may disconnect selected higher charge energy storage unit from resonant circuit. For example, the disconnection may be performed based on an elapsed time (e.g., determined based on the size of the resonant circuit components $C_T$ and $L_T$) or based on sensing the charge at the resonant circuit by the controller.

At 412, the controller may connect a selected lower charge energy storage unit to the resonant circuit to transfer energy to the selected lower charge energy storage unit. In some examples, the connection to the lower charge energy storage unit may be timed approximately with a zero crossing event of the alternating current at the resonant circuit. As one example, the lower charge energy storage unit may be charged until a peak voltage of the resonant circuit is equal to or less than the voltage of the energy storage unit being charged. As another example, the lower charge energy storage unit may be charged for a predetermined period of time sufficient to transfer an optimal charge from the resonant circuit determined, e.g., based at least partially on the resonant frequency.

At 414, the controller may disconnect the selected lower charge energy storage unit from the resonant circuit following transfer of energy to the selected lower charge energy storage unit. For example, the disconnection may be timed to occur at a peak voltage in the case of positive voltage or to occur at the bottom of a trough in the sine wave in the case of reversed polarity switching and a negative voltage.

At 416, the controller may determine if there are additional energy storage units to balance. If so, the process goes to 408 to select the energy storage units to balance. If not, the process goes to 402 and may be repeated continually or periodically.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, methods, and techniques described herein may be considered in the general context of computer-executable instructions, such as computer programs and firmware stored on computer-readable media, and executed by the processor(s) and controller(s) herein. Generally, the terms program and firmware may be used interchangeably, and may include instructions, routines, modules, objects, components, data structures, executable code, etc., for performing particular tasks or implementing particular data types. These programs, firmware, and the like, may be executed as native code or may be downloaded and executed, such as in a virtual machine or other just-in-time compilation execution environment. Typically, the functionality of the programs and firmware may be combined or distributed as desired in various implementations. An implementation of these programs, firmware, and the like may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A circuit for balancing charges between a plurality of energy storage units connected in series, the circuit comprising:
    a resonant circuit including a capacitor and an inductor connected in parallel;
    a switch array including a plurality of switches able to connect individual ones of the energy storage units to the resonant circuit; and
    a controller configured to:
        connect a relatively high charge one of the energy storage units to the resonant circuit to transfer energy from the relatively high charge energy storage unit to the resonant circuit; and
        connect a relatively low charge energy storage unit to the resonant circuit to transfer the energy from the resonant circuit to the relatively low charge energy storage unit to at least partially balance an electrical charge,
    wherein:
    the resonant circuit is connectable to a high-side bus and a low-side bus,
    the plurality of switches are able to connect individual ones of the energy storage units to the high-side bus and the low-side bus for connecting the resonant circuit to the individual energy storage units, and
    the circuit further comprises a plurality of pairs of switches coupled to respective ones of the energy storage units, wherein a first switch of each pair is operable for connecting a high side of the respective energy storage unit to the high-side bus and a second switch of each pair is operable for connecting a low side of the respective energy storage unit to the low-side bus.

2. The circuit as recited in claim 1, wherein the controller is configured to time connecting the relatively low charge energy storage unit to the resonant circuit based on an expected zero crossing event of an alternating current in the resonant circuit following the transfer of the energy to the resonant circuit.

3. The circuit as recited in claim 1, wherein the controller is configured to time disconnecting the relatively low charge energy storage unit from the resonant circuit based on an expected peak or trough event of an alternating current in the resonant circuit following the transfer of the energy to the resonant circuit.

4. The circuit as recited in claim 1, wherein the controller is able to be coupled to each of the energy storage units by the high-side bus and the low-side bus for sensing a relative state of charge of each of the energy storage units to determine the relatively high charge energy storage unit and the relatively low charge energy storage unit.

5. The circuit as recited in claim 4, further comprising an analog-to-digital converter (ADC) for coupling the controller to the high-side bus and the low-side bus, the ADC configured to receive a signal from an individual one of the energy storage units connected to the high-side bus and provide a corresponding numerical value to the controller indicative of a charge on the individual energy storage unit.

6. The circuit as recited in claim 1, wherein the energy storage units are at least one of:
    cells connected in series in a battery;
    batteries connected in series in a battery pack; or
    supercapacitor cells connected in series.

7. A circuit for balancing charges between a plurality of energy storage units connected in series, the circuit comprising:
    a resonant circuit including a capacitor and an inductor connected in parallel;
    a switch array including a plurality of switches able to connect individual ones of the energy storage units to the resonant circuit;
    a plurality of pairs of switches coupled to respective ones of the energy storage units, wherein a first switch of each pair is operable for connecting a higher electrical potential side of the respective energy storage unit to a high-side bus, and a second switch of each pair is operable for connecting a lower electrical potential side of the respective energy storage unit to a low-side bus; and
    a controller configured to:
        connect a relatively high charge one of the energy storage units to the resonant circuit to transfer energy from the relatively high charge energy storage unit to the resonant circuit; and
        connect a relatively low charge energy storage unit to the resonant circuit to transfer the energy from the resonant circuit to the relatively low charge energy storage unit to at least partially balance an electrical charge.

8. The circuit as recited in claim 7, wherein the controller is configured to time connecting the relatively low charge energy storage unit to the resonant circuit based on an expected zero crossing event of an alternating current in the resonant circuit following the transfer of the energy to the resonant circuit.

9. The circuit as recited in claim 7, wherein the controller is configured to time disconnecting the relatively low charge energy storage unit from the resonant circuit based on an expected peak or trough event of an alternating current in the resonant circuit following the transfer of the energy to the resonant circuit.

10. The circuit as recited in claim 7, wherein:
    the resonant circuit is connectable to the high-side bus and the low-side bus; and
    the plurality of switches are able to connect individual ones of the energy storage units to the high-side bus and the low-side bus for connecting the resonant circuit to the individual energy storage units.

11. The circuit as recited in claim 10, wherein the controller is able to be coupled to each of the energy storage units by the high-side bus and the low-side bus for sensing a relative state of charge of each of the energy storage units to determine the relatively high charge energy storage unit and the relatively low charge energy storage unit.

12. The circuit as recited in claim 11, further comprising an analog-to-digital converter (ADC) for coupling the controller to the high-side bus and the low-side bus, the ADC configured to receive a signal from an individual one of the energy storage units connected to the high-side bus and provide a corresponding numerical value to the controller indicative of a charge on the individual energy storage unit.

13. The circuit as recited in claim 7, wherein the energy storage units are at least one of:
    cells connected in series in a battery;
    batteries connected in series in a battery pack; or
    supercapacitor cells connected in series.

14. A circuit for balancing charges between a plurality of energy storage units connected in series, the circuit comprising:
- a resonant circuit including a capacitor and an inductor connected in parallel;
- a switch array including a plurality of switches able to connect individual ones of the energy storage units to the resonant circuit; and
- a controller configured to:
  - connect a relatively high charge one of the energy storage units to the resonant circuit to transfer energy from the relatively high charge energy storage unit to the resonant circuit; and
  - connect a relatively low charge energy storage unit to the resonant circuit to transfer the energy from the resonant circuit to the relatively low charge energy storage unit to at least partially balance an electrical charge, wherein:
- the resonant circuit is connectable to a high-side bus and a low-side bus,
- the plurality of switches are able to connect individual ones of the energy storage units to the high-side bus and the low-side bus for connecting the resonant circuit to the individual energy storage units, and
- the controller is able to be coupled to each of the energy storage units by the high-side bus and the low-side bus for sensing a relative state of charge of each of the energy storage units to determine the relatively high charge energy storage unit and the relatively low charge energy storage unit.

15. The circuit as recited in claim 14, wherein the controller is configured to time connecting the relatively low charge energy storage unit to the resonant circuit based on an expected zero crossing event of an alternating current in the resonant circuit following the transfer of the energy to the resonant circuit.

16. The circuit as recited in claim 14, wherein the controller is configured to time disconnecting the relatively low charge energy storage unit from the resonant circuit based on an expected peak or trough event of an alternating current in the resonant circuit following the transfer of the energy to the resonant circuit.

17. The circuit as recited in claim 14, wherein the controller is able to be coupled to each of the energy storage units by the high-side bus and the low-side bus for sensing a relative state of charge of each of the energy storage units to determine the relatively high charge energy storage unit and the relatively low charge energy storage unit.

18. The circuit as recited in claim 17, further comprising an analog-to-digital converter (ADC) for coupling the controller to the high-side bus and the low-side bus, the ADC configured to receive a signal from an individual one of the energy storage units connected to the high-side bus and provide a corresponding numerical value to the controller indicative of a charge on the individual energy storage unit.

19. The circuit as recited in claim 14, wherein the energy storage units are at least one of:
- cells connected in series in a battery;
- batteries connected in series in a battery pack; or
- supercapacitor cells connected in series.

\* \* \* \* \*